United States Patent Office 3,556,844
Patented Jan. 19, 1971

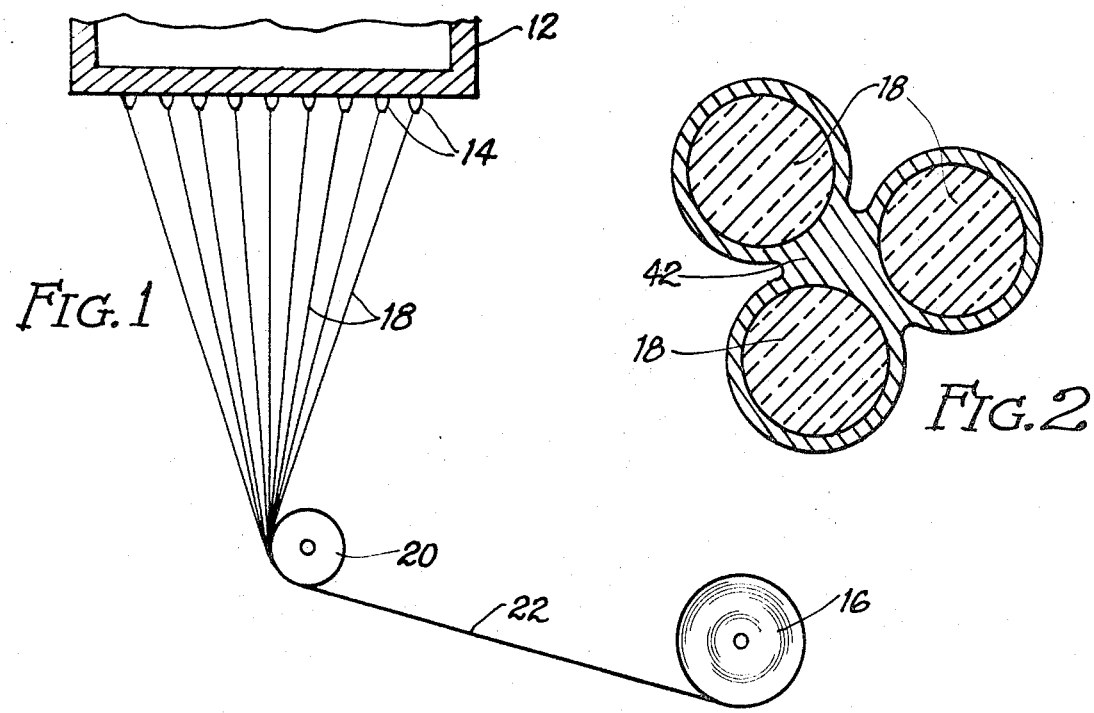
*Fig. 1*
*Fig. 2*
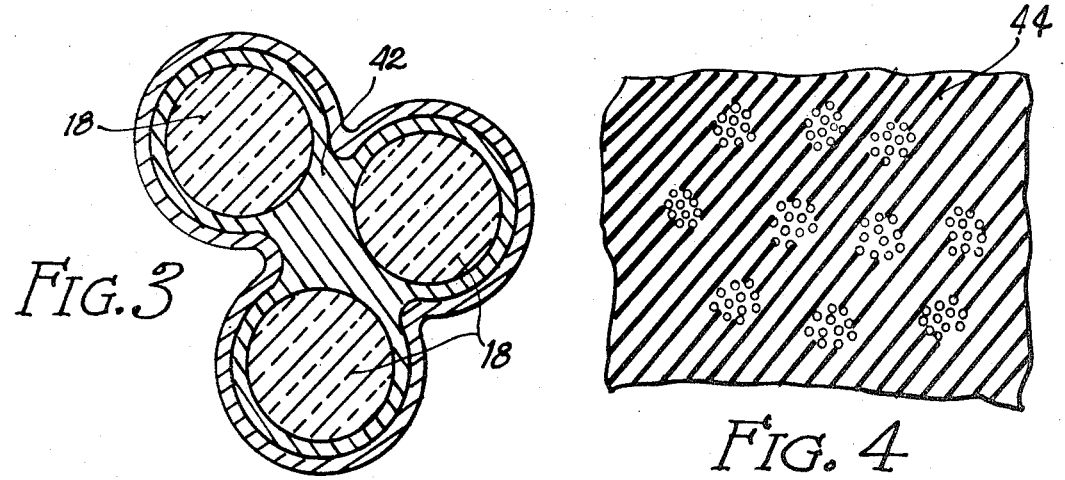
*Fig. 3*
*Fig. 4*
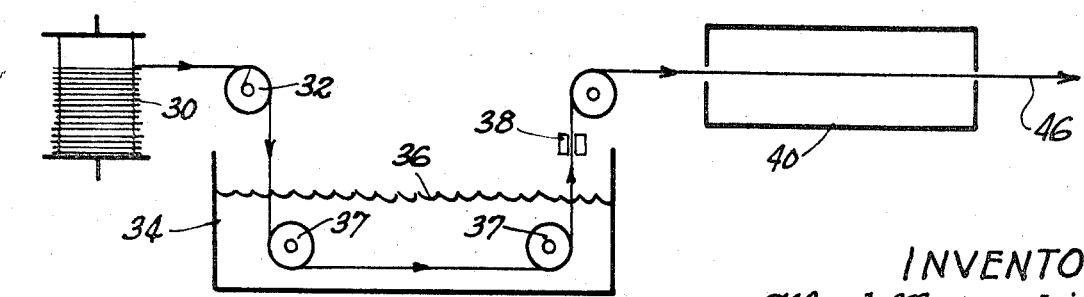
*Fig. 5*
INVENTOR
Alfred Marzocchi
by Staelin and Overman
Att'ys

3,556,844
ELASTOMER IMPREGNATED FIBROUS GLASS
AND METHODS FOR ITS MANUFACTURE
Alfred Marzocchi, 35 Thomas Leighton Blvd.,
Cumberland, R.I. 02864
Continuation-in-part of application Ser. No. 424,790,
Jan. 11, 1965. This application Sept. 25, 1968,
Ser. No. 762,468
The portion of the term of the patent subsequent to Nov.
22, 1983, has been disclaimed and dedicated to the
Public
Int. Cl. C03c 25/02
U.S. Cl. 117—65.2                                    12 Claims

ABSTRACT OF THE DISCLOSURE

The preparation of glass fiber-elastomeric products wherein the glass fiber component, prior to the combination with the continuous phase elastomer, is formed into bundles and impregnated with an elastomeric composition and partially cured to advance the elastomeric component of the impregnating composition to a stage which will militate against its displacement from within the glass fiber bundle whereby the glass fibers are integrated into the elastomeric system without the need to make use of an anchoring agent for interbonding the glass fiber surfaces to the elastomer and which includes an interfacial coating about the impregnated bundle of glass fibers to assimilate the partially cured elastomeric component of the impregnant with the continuous phase elastomer of the rubber product.

---

This is a continuation-in-part of my copending application Ser. No. 424,790, filed Jan. 11, 1965, and entitled "Elastomer Impregnated Fibrous Glass and Methods for the Manufacture" and now abandoned.

This invention relates to products fabricated of natural or synthetic rubbers reinforced with glass fibers and it relates more particularly to a method and means for the treatment of glass fibers to make them more receptive to cured or vulcanized elastomeric materials in the form of natural or synthetic rubbers and to the combination of such treated glass fibers and elastomeric materials in the manufacture of belting, tires and other glass fiber-elastomeric products.

Research and development have, through the ages since the discovery of natural rubber, contributed materially to the utilization of rubbers and in the products manufactured thereof. The more notable of these improvements has been in the combination to make use of fibers as a reinforcement to improve physical and mechanical properties of the elastomeric materials and products manufactured thereof. Using rubber tires as an example, utilization has first been made of cotton as tire cord. Until about 1940, cotton predominated in the tire cord industry until the introduction of synthetic fibers in the sequence of rayon, nylon and the polyesters, with rayon still dominating the new car market and nylon dominating the replacement tires and truck tires. The polyester resinous fibers are presently finding wider acceptance by reason of increased tenacity, flexure life and resistance to flat-spotting by comparison with others of the synthetic resinous fibers.

By reason of increased vehicle weights, increased amounts of long distance driving at high speeds with corresponding increase in tire temperature, smoother riding vehicles, smoother roads which accentuate tire irregularities, power steering and power brakes, and increased acceleration rates, still greater demands have been imposed upon the fibers in tire cords manufactured of fibers and used as a reinforcement for the elastomeric materials.

It is believed that glass fibers embody many of the attributes which would designate such fibers and fabrics formed thereof as the ultimate for use in combination with rubbers and elastomers in the manufacture of tires, belting and the like fiber-elastomeric products.

For example, as illustrated by the following Table I, glass fibers and fabrics formed thereof have very high tensile strengths. Glass fibers are mildew and rot-proof. Glass fibers are thermally stable at temperatures above that which would cause deterioration of the rubber phase. Moisture will have little, if any, effect on the cord or elastomeric products formed therewith by reason of the complete imperviousness of glass fibers to water. By comparison with others of the fibers used in combination with elastomeric materials in the manufacture of tires and the like elastomeric products, glass fibers are dimensionally stable thereby to minimize stretch and the like characteristics in use and predeterminations can be made to specify fixed elongation characteristics. It has been found also that by reason of the greater modulus, fiber stability and fixed elongation characteristics, with minimum heat build-up, tires with greater tread life can be produced with better fuel mileage.

The following is a comparison of the properties of the various fibers which have been used or are proposed for use with elastomers in the manufacture of fiber reinforced elastomeric products:

TABLE I.—PHYSICAL PROPERTIES OF SINGLE FILAMENTS

|  | Glass ECG | Rayon T-130 | Nylon T-A05 | Polyester T-52 |
|---|---|---|---|---|
| Tensile strength, ultimate (p.s.i.) | 500,000 | 79,000 | 126,000 | 139,000 |
| At 1% elongation | 105,000 | 15,000 | 7,000 | 16,000 |
| At 3% elongation | 315,000 | 34,000 | 15,000 | 31,000 |
| Tenacity at break, g.p.d | 15.32 | 4.05 | 8.65 | 7.89 |
| At 1% elongation | 3.22 | 0.77 | 0.45 | 0.92 |
| At 3% elongation | 9.66 | 1.74 | 1.02 | 1.74 |
| Elongation, ultimate (percent) | 4.76 | 11.74 | 19.93 | 14.92 |
| At 20% load | 0.95 | 1.09 | 4.80 | 2.60 |
| Modulus, g.p.d | 322 | 35 | 43 | 53 |
| 1000 p.s.i | 10,500 | 680 | 630 | 940 |
| Toughness, g.p.d | 0.365 | 0.312 | 1.05 | 0.720 |
| P.s.i | 11,900 | 6,100 | 15,300 | 12,800 |
| Density, gm./cm.$^3$ | 2.55 | 1.53 | 1.14 | 1.38 |
| Denier (untreated) | 1.59 | 0.703 | 5.62 | 4.53 |
| TPI | 0 | 0 | 0 | 0 |

It will be obvious from the foregoing that glass fibers should provide a many-fold increase in the strength and other characteristics of fiber reinforced elastomeric products. However, a number of problems remain to be solved before full utilization could be made of the desirable characteristics of glass fibers in combinations with cured or vulcanized natural or synthetic rubbers.

One of the principal problems faced in making fuller utilization of the desirable properties of glass fibers is in the ability to intertie the glass fibers into the elastomeric materials which form the continuous phase in the glass fiber reinforced product, such as rubber belting, rubber tires and the like, where the strength, dimensional stability and inertness of the glass fibers are important factors. To some extent, this problem has been alleviated by the use of anchoring agents such as amino silanes, as represented by gamma-aminopropyltriethoxy silane, as an anchoring coating on the glass fiber surfaces applied prior to the combination with elastomeric materials, as described more fully in copending application Ser. No. 750,253, filed July 22, 1958, entitled "Structures Formed of Glass Fiber-Elastomer Systems."

Another of the important problems resides in the desire to make use of the glass fibers in the form of strands or bundles wherein as many as 200 or more filaments are gathered together per strand and wherein a number of such strands are twisted or plied together to form yarns or cords for use as reinforcement in the manufacture of tires and the like. Reinforcement with single filaments of glass fibers is impractical and expensive such that the art has sought to develop processes wherein the reinforcing glass fibers might be employed in the form of endless bundles such as strands, yarns and cords.

It is an object of this invention to provide a method and means for the treatment of glass fibers embodying plural coatings on the glass fiber surfaces but wherein such plural coatings remain substantially compatible with the elastomeric materials forming the continuous phase to enable substantially complete blending therewith whereby the treated glass fibers become substantially fully integrated into the elastomeric system without separation or delamination therebetween thereby completely to tie in the bundles of glass fibers with the continuous phase of elastomeric material in the manufacture of the glass fiber-elastomeric products.

These and other objects and advantages of this invention will hereinafter appear and for purposes of illustration, but not of limitation, an embodiment of the invention is shown in the accompanying drawings, in which—

FIG. 1 is a diagrammatic elevational view of the process of continuous forming of glass fibers into strands or bundles;

FIG. 2 is an enlarged sectional view through a portion of the strand impregnated wtih the elastomeric composition in accordance with the practice of this invention;

FIG. 3 is an enlarged sectional view similar to that of FIG. 2 showing the impregnated strand with an overcoating of an assimilating agent;

FIG. 4 is enlarged sectional view through a portion of the strand of glass fibers embodied in the elastomeric product; and FIG. 5 is a schematic view of an impregnation system for glass fiber bundles.

Briefly described, the invention resides in the treatment of glass fibers prior to their combination with the continuous phase of elastomeric material to impregnate the glass fiber strand, yarn, cord or fabric formed of a plurality of glass fibers, hereinafter referred to as a glass fiber bundle, with a composition containing a curable or a vulcanizable elastomeric material as a principal component thereof; processing the impregnated glass fiber bundle partially to cure or vulcanize the elastomeric material to permit subsequent processing by winding, weaving, plying, twisting and the like with a minimum amount of seizure and without squeezing out impregnating material while still enabling sufficient flowability during subsequent cure or vulcanization of the continuous phase elastomeric material with which the treated glass fibers are combined to permit inflow between the elastomer of the impregnant and that of the continuous phase whereby interfacial characteristics are eliminated more completely to tie in the systems one into the other to maximize the desirable characteristics of the glass fibers; and, though not essential, the overcoating of the partially cured or partially vulcanized impregnated bundle of glass fibers with an anchoring or blending agent in the form of an amino silane, such as gamma-aminopropyltriethoxy silane, further to enhance the interbonded relationship between the cured or vulcanized rubber of the continuous phase and the rubbery component of the glass fiber bundle thereby to enhance the blend between the two rubbery phases for more complete integration Impregnation of the strand or bundle with elastomeric material not only suffices to cushion the fibers one from the other; to protect the fibers against destruction by mutual abrasion and to provide flexibility in the fiber system to enable alignment of the fibers in the bundle while under stress so that a number of fibers in the bundle can be brought into play to resist rupture, but impregnation insures the presence of elastomeric material distributed in and throughout the glass fiber bundle whereby, in response to cure in forming to the final tire, belt or other elastomeric-glass fiber product, the glass fibers are integrated completely into the product thereby to take fullest advantage of the use intended to be made of the fibers. In the absence of such impregnation with the elastomeric material, while the fibers are in strand or in yarn form, little, if any, rubber would enter into the fiber bundle from the continuous phase. As a result, only the outer layers of the glass fibers in the bundle would be in intimate contact with the elastomeric material and even then the failure completely to encompass the fibers would result in very little, if any, intertie between the fibers and the elastomeric material such that only a small percentage of the glass fibers would be in a position to contribute to the final product.

Referring now to the drawings, the numeral 10 represents the bottom side of a glass melting furnace 12 in which the bushing is formed with a plurality of openings through which streams 14 of molten glass issue by gravitational force.

The streams 14 are rapidly attenuated by winding about a winding drum 16 to form the continuous glass fibers 18 of 0.0001 inch to 0.0015 inch. The filaments 18 are gathered together at a wiping pad or roller 20 to form the fibers into a strand 22.

Next the strands or bundle of glass fibers are impregnated with a composition containing, as an essential and principal ingredient, a vulcanizable or curable elastomeric material, preferably the same type of elastomer which is to be employed as the continuous phase with which the glass fibers are to be combined in the manufacture of the vehicle tire, belting or like glass fiber-vulcanized rubber product.

The following are representative of compositions which may be used for coating or impregnation of the sized bundles of glass fibers:

EXAMPLE 1

| | Parts by weight |
|---|---|
| Neoprene rubber | 100 |
| Powdered magnesium oxide | 4 |
| Zinc oxide | 5 |
| Channel black | 15 |
| Thiate B (trialkyl thiourea accelerator) | 1 |

EXAMPLE 2

| | Parts by weight |
|---|---|
| Paracril C | 100 |
| Carbon black | 25 |
| Powdered zinc oxide | 5 |
| Aminox (diphenylamine acetone product) | 0.5 |
| Stearic acid | 1 |
| Dicumyl peroxide | 40 |

In the foregoing examples, the compositions are diluted to 30–40 percent solids with toluene or xylene.

EXAMPLE 3

| | Parts by weight |
|---|---|
| Natural rubber latex—resorcinol—formaldehyde resin dispersed in aqueous medium to 38% by weight solids (Lotol 5440—U.S. Rubber Co.) | 40–80 |
| Water | 20–60 |

EXAMPLE 4

| | Parts by weight |
|---|---|
| Resorcinol-formaldehyde resin | 2.0 |
| Formaldehyde (37% solution) | 1.0 |
| Concentrated ammonium hydroxide | 2.7 |
| Butadiene-styrene-vinyl pyridine terpolymer latex (42% solids) | 25.0 |
| Neoprene rubber latex (50% solids) | 41.0 |
| Butadiene latex (60% solids) | 41.0 |
| Sodium hydroxide | 0.05 |
| Gamma-aminopropyltriethoxy silane | 1.0 |
| Peroxide catalyst | 1.0 |
| Water | 1100 |

The rubber latex-resorcinol formaldehyde resin of Example 3 is of the type described in Canadian Patent No. 435,754 to the U.S. Rubber Company.

As illustrated in FIG. 5, the strand 22 of glass fibers is paid out from a spool 30 and trained over rollers 32 for passage downwardly into a housing 34 containing a bath 36 of the treating composition as represented by Examples 1–4. The impregnated bundle of glass fibers passes out from the bath through a wiping die 38 which operates to remove excess coating composition from the treated bundle of glass fibers and to work the composition into the innermost regions of the fiber bundle.

It is desirable to achieve as complete impregnation of the glass fiber bundle as is possible, as previously pointed out in the introductory portion of this specification. Impregnation or coating with the elastomeric material composition can be enhanced by the technique of flexing or bending the bundles of glass fibers while in the bath 36 of the treating composition or while wet with the treating composition as by running the glass fiber bundle over bars or other sharp flexing or bending means 37. Instead, or in combination therewith, fuller impregnation can be achieved by the use of pressure dies or by advancement of the glass fiber bundle through dies which provide for pulsations between high and low pressures to work the impregnating composition into the glass fiber bundle while at the same time withdrawing entrapped gases, or by the technique of ultrasonic vibration during impregnation.

Instead, impregnation can be achieved by extrusion of the fiber bundle from a container in which the fiber bundle and the treating composition are maintained under positive pressure thereby to place the glass fiber bundle under compression during passage from the container to spread the glass fibers in a manner to permit substantially complete impregnation with the treating composition as the fiber bundle is pushed through the extrusion orifice, as more fully described in the copending application of Alfred Marzocchi and John A. Waugh, Ser. No. 427,050, filed June 21, 1965, and entitled "Method for the Impregnation of Fibrous Glass."

Immediately following impregnation, the bundle of glass fibers is advanced through a zone 40 heated to a temperature within the range of 250–450° F. to effect removal of diluent and to advance the elastomer, by cure or vulcanization, to an intermediate stage or cure of vulcanization so that some flow under heat and pressure will remain to tie in the elastomer of the impregnated glass fiber bundle with the continuous phase elastomer during molding to the final product. Usually exposure for a time ranging from ½ to 5 minutes at a temperature within the described range will suffice to effect the desired advancement although shorter times can be employed at still higher temperature or by modification of the formulation to include any of the conventional accelerator or vulcanizing agents in an amount within the range of 0.1 to 1 percent by weight of the composition.

The glass fiber bundle impregnated with the partially cured elastomeric composition 42 can be combined directly with the elastomeric material forming the continuous phase 44 of the final product for molding into the final product. In the preferred practice, the glass fiber bundle 46 impregnated with the partially cured elastomeric system 42 can be further treated to provide for an additional overcoating 48 in the form of an assimilation coating which is intended strongly to intertie the continuous phase elastomer 44 with the elastomer 42 impregnating the glass fiber bundle during the final molding step. For this purpose, use can be made of an amino silane, a carboxylato silane and their hydrolysis products and polymerization products or a Werner complex compound having an amino group or carboxylato group coordinated with the trivalent nuclear chromium atom, or use can be made of a di- or polyfunctional compound which is a solvent or plasticizer for the elastomer, as represented by the following examples:

EXAMPLE 5

0.1 to 5.0 percent by weight gamma-aminopropyltriethoxysilane
Remainder water

EXAMPLE 6

0.1 to 5.0 percent by weight carboxylate chromic chloride
Remainder water

EXAMPLE 7

1.0 to 5.0 percent by weight ethylene dimethacrylate
Remainder solvent

EXAMPLE 8

1.0 to 5.0 percent by weight isocyanate
Remainder solvent

Application is made by a dip coat process on the fibrous structure previously impregnated with the elastomeric composition and partially cured. The coated fibrous structure is air dried or preferably dried at elevated temperature up to a temperature of about 300° F. to drive off the diluent. This leaves a thin coating 48 of the assimilation material or other anchoring agent on the outer surfaces of the impregnated glass fiber bundle.

The amino silanes such as the gamma-aminopropyltriethoxy silane may be replaced with a glycidoxy silane, its hydrolysis product or its polymerization product wherein the glycidoxy group is on the second and third or third and fourth carbon atoms of a $C_3$ or $C_4$ silane as represented by the following formulae:

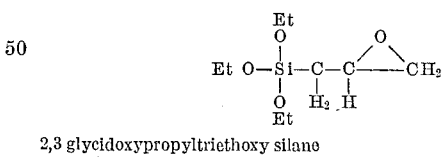

2,3 glycidoxypropyltriethoxy silane

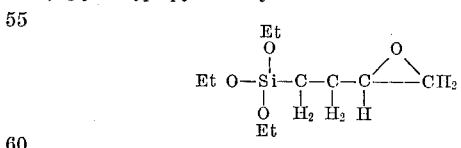

3,4 glycidoxybutyltriethoxy silane

EXAMPLE 9

| Impregnating composition: | Parts by weight |
|---|---|
| Resorcinol-formaldehyde resin | 2.0 |
| Formaldehyde (37% solution) | 1.0 |
| Concentrated ammonium hydroxide | 2.7 |
| Butadiene-styrene-vinyl pyridine terpolymer latex (42% solids) | 25.0 |
| Neoprene rubber latex (50% solids) | 41.0 |
| Butadiene latex (60% solids) | 5.0 |
| Sodium hydroxide | 0.05 |
| 3,4 glycidoxybutyltriethoxy silane | 1.0 |
| Peroxide catalyst | 1.0 |
| Water | 1100 |

EXAMPLE 10

Impregnating composition:

| | Parts by weight |
|---|---|
| Neoprene rubber | 100 |
| Powdered magnesium oxide | 4 |
| Zinc oxide | 5 |
| Channel black | 15 |
| Thiate B (trialkyl thiourea accelerator) | 1 |
| 2,3 glycidoxypropyltriethoxy silane | 1 |

EXAMPLE 11

Composition for overcoating 48:

0.1–3.0 percent by weight gamma-aminopropyltriethoxysilane
0.1–3.0 percent by weight 2,3 glycidoxypropyltriethoxysilane
Remainder solvent

EXAMPLE 12

Composition for overcoating 48:

0.1–5.0 percent by weight 3,4 glycidoxybutyltriethoxysilane
Remainder solvent

For use in tire manufacture, the endless lengths of glass fibers are usually subjected to the additional processing steps of winding, twisting and plying to form cords which are employed in the same manner as cotton, rayon, nylon or polyester cords in the manufacture of bias tires of the type customarily produced for use in the United States, or the formed cords find excellent use in the manufacture of radially wound tires of the type customarily employed in the European market where a harder ride but a higher strength is desired.

During cure or vulcanization, the partially cured elastomeric material impregnating the glass fiber bundle is capable of flow under the heat and pressure conditions existng during vulcanization or cure to eliminate any interface between the continuous rubber phase and the elastomeric component of the impregnant. Thus it will be apparent that means are provided for fuller utilization of the glass fiber system within the continuous phase of elastomeric material whereby the glass fibers are effectively engaged in the elastomeric product for fuller utilization of their strength properties. At the same time, the elastomeric impregnant cushions the fibers and protects the fibers in the reinforcing structure to enable relative movement between the fibers for lengthwise alignment in the direction of stress or strain while still protecting the glass fibers against deterioration by wear or abrasion.

It will be apparent that, when processed in the manner described, the glass fiber component can be laid up with the sheets of elastomeric material for molding into the tires, belts and the like fiber-elastomeric products with the fibers in any desired arrangement in the form of strands, yarns, bundles, cords or fabrics or combinations thereof.

An important concept of this invention resides in the discovery that, when the glass fiber bundle is adequately impregnated with an elastomeric composition and partially cured, it is no longer important to rely on a strong and permanent bonded relationship between the glass fiber surfaces and the elastomeric material and that optimum utilization can be made of the glass fiber component in the absence of the use of an anchoring agent or size formulated to contain in anchoring agent for such interbonding purposes. It appears that the elastomeric impregnant becomes sufficiently intermeshed with the plurality of glass fibers making up the bundle to more or less integrate the bundle into a composite element incapable of separation or action independent of the elastomeric impregnant. As a result, when the impregnant becomes a part of the continuous rubber phase during subsequent molding and cure or vulcanization of the elastomeric product, the glass fibers become completely tied into the product and a contributing factor to the properties thereof.

The glass fibers can be sized in forming to enhance the processing of the glass fibers to bundle form by a size on the glass fiber surfaces is no longer necessary and in fact often undesirable in the final product. By way of further modification, the elastomeric impregnant can be introduced into the glass fiber bundle by coating the individual glass fibers in forming, with or without subsequent impregnation of the glass fiber bundle, to introduce the elastomeric composition into the innermost regions of the glass fiber bundle formed thereof. It is preferred, however, to make use of an impregnation step of the type described more completely to fill or to load the glass fiber bundle with the elastomeric composition even when applied to the individual glass fibers in forming.

As used herein, the term "fiber bundles" is intended also to include yarns or strands of discontinuous glass fibers.

The term "elastomer," as used herein, is intended to include natural rubbers and synthetic rubbers, such as chloroprene, butylene, isoprene, neoprene, butadiene polymers and copolymers, with styrene, acrylonitrile and acrylates, chlorinated rubbers, and the like.

As used herein and in the claims, the term "cured" shall include cured and vulcanized in the same sense as they are employed in the rubber art.

As used in the claims, the term "silane" is intended to include the silane, its hydrolysis products and its polymerization products.

It will be understood that changes may be made in the details of construction, formulation and fabrication without departing from the spirit of the invention, especially as defined in the following claims.

I claim:

1. In the fabrication of glass fiber-elastomeric products, which includes the steps of bringing together a multiplicity of glass fibers into a substantially endless bundle, impregnating the endless bundle of glass fibers with a fluid composition containing an elastomeric component as an essential ingredient, and then heating the impregnated bundle of glass fibers to advance the elastomeric component to a partially cured stage, the improvement consisting of impregnating the bundle of glass fibers with the elastomeric material without any pre-treatment of the glass fibers in the glass fiber bundle.

2. The process as claimed in claim 1 which includes the step of coating the impregnated glass fiber bundle with an assimilation compound selected from the group consisting of an amino silane, a carboxy silane, a Werner complex compound in which the carboxylato group coordinated with the trivalent nuclear chromium atom contains a group selected from the group consisting of amino and carboxyl groups, and a polyfunctional compound which is a solvent or plasticizer for the elastomeric material.

3. The process as claimed in claim 2 in which the polyfunctional compound is ethylene dimethacrylate.

4. The process as claimed in claim 1 in which the elastomer of the impregnant is the same as the continuous phase elastomer of the glass fiber product.

5. The process as claimed in claim 1 which includes the steps of combining the impregnated and partially cured glass fiber bundle with uncured elastomeric material forming the continuous phase of the glass fiber product, and molding the combination under heat and pressure to the desired product whereby the elastomer of the impregnant becomes blended with elastomer in the adjacent portions of the continuous phase to tie in the glass fiber system into the glass fiber product.

6. The process as claimed in claim 5 in which the continuous phase elastomer and the elastomer of the impregnant are the same.

7. A cured elastomeric-glass fiber product consisting of a continuous phase of a cured elastomeric material, glass fiber bundles distributed in the continuous phase of elastomeric material and an impregnant in the glass fiber bundle containing an elastomeric component as an essential ingredient thereof and in which the elastomeric component of the impregnant is blended with the continuous phase of cured elastomeric material to integrate the glass fiber bundle into the elastomeric product.

8. A product as claimed in claim 7 which includes an assimilation agent between the bundle of impregnated glass fibers and the elastomeric material of the continuous phase to assimilate the elastomeric material of the impregnant with the elastomeric material of the continuous phase.

9. A product as claimed in claim 8 in which the assimilation agent is a compound selected from the group consisting of an amino silane, a carboxy silane, a Werner complex compound in which the carboxylato group coordinated with the trivalent nuclear chromium atom contains an amino or carboxyl group, and a polyfunctional compound which is a solvent or plasticizer for the elastomer.

10. A product as claimed in claim 7 in which the elastomer of the continuous phase is the same as the elastomer of the impregnant.

11. In the fabrication of glass fiber-elastomeric products, which includes the steps of bringing together a multiplicity of the glass fibers into a substantially endless bundle, impregnating the endless bundle of glass fibers with a fluid composition formulated of an elastomeric component as an essential ingredient and a diluent, and heating the impregnated bundle of glass fibers for removal of the diluent, the improvement consisting of impregnating the bundle of glass fibers with the elastomeric material without any pre-treatment of the glass fibers in the glass fiber bundle.

12. The process as claimed in claim 11 which includes the step of combining the impregnated bundle of glass fibers with uncured elastomeric material representing the continuous phase of the glass fiber product and molding the combination under heat and pressure to the desired product whereby the elastomer of the impregnant becomes blended with the elastomer in the continuous phase adjacent the glass fiber bundle to tie in the glass fiber reinforcement into the elastomeric product.

References Cited

UNITED STATES PATENTS

| | | | |
|---|---|---|---|
| 2,686,737 | 8/1954 | Caroselli et al. | 117—126X |
| 3,287,204 | 11/1966 | Marzocchi | 117—126X |
| 3,391,052 | 7/1968 | Marzocchi | 117—72X |
| 3,424,608 | 1/1969 | Marzocchi et al. | 117—126X |

FOREIGN PATENTS

| | | | |
|---|---|---|---|
| 942,914 | 9/1948 | France | 117—93.1 |

WILLIAM D. MARTIN, Primary Examiner

D. COHEN, Assistant Examiner

U.S. Cl. X.R.

117—72, 126; 161—93

UNITED STATES PATENT OFFICE
CERTIFICATE OF CORRECTION

Patent No. 3,556,844                    Dated    January 19, 1971

Inventor(s)    Alfred Marzocchi

It is certified that error appears in the above-identified patent and that said Letters Patent are hereby corrected as shown below:

In the heading to the printed specification, after line , insert -- assignor to Owens-Corning Fiberglas Corporation, corporation of Delaware --.

Signed and sealed this 7th day of March 1972.

SEAL)
ttest:

DWARD M. FLETCHER, JR.                        ROBERT GOTTSCHALK
ttesting Officer                              Commissioner of Patents

UNITED STATES PATENT AND TRADEMARK OFFICE
CERTIFICATE OF CORRECTION

PATENT NO. : 3,556,844
DATED : January 19, 1971
INVENTOR(S) : Alfred Marzocchi

It is certified that error appears in the above—identified patent and that said Letters Patent are hereby corrected as shown below:

At col. 5, line 9, referring to Butadiene latex, change "41.0" to --5.0--.

At col. 6, line 23, change "carboxylate" to --carboxylato--.

Signed and Sealed this

Seventeenth Day of March 1981

[SEAL]

Attest:

RENE D. TEGTMEYER

*Attesting Officer*    *Acting Commissioner of Patents and Trade*